US012082754B2

(12) United States Patent
Brown et al.

(10) Patent No.: US 12,082,754 B2
(45) Date of Patent: Sep. 10, 2024

(54) TOILET SEAT CLEANING DEVICE

(71) Applicants: Lemoy Brown, Perris, CA (US); Larklin Brown, Perris, CA (US)

(72) Inventors: Lemoy Brown, Perris, CA (US); Larklin Brown, Perris, CA (US)

( * ) Notice: Subject to any disclaimer, the term of this patent is extended or adjusted under 35 U.S.C. 154(b) by 428 days.

(21) Appl. No.: 17/529,576

(22) Filed: Nov. 18, 2021

(65) Prior Publication Data

US 2023/0148805 A1 May 18, 2023

(51) Int. Cl.

*A47K 13/30* (2006.01)
*B08B 1/16* (2024.01)
*B08B 1/30* (2024.01)
*B08B 3/02* (2006.01)
*B08B 13/00* (2006.01)

(52) U.S. Cl.

CPC ............ *A47K 13/302* (2013.01); *B08B 1/165* (2024.01); *B08B 1/30* (2024.01); *B08B 3/024* (2013.01); *B08B 13/00* (2013.01)

(58) Field of Classification Search

CPC ........ A47K 13/30; A47K 13/302; B08B 1/30; B08B 1/165; B08B 3/024; B08B 13/00
USPC .............................................................. 4/233
See application file for complete search history.

(56) References Cited

U.S. PATENT DOCUMENTS 5,504,946 A * 4/1996 Keshiro ............... A47K 13/302 4/233
5,813,057 A * 9/1998 Descent ............... A47K 13/302 4/233

FOREIGN PATENT DOCUMENTS

JP H06189875 A * 7/1997 ........... A47K 13/302

* cited by examiner

*Primary Examiner* — Tuan N Nguyen
(74) *Attorney, Agent, or Firm* — The Iwashko Law Firm, PLLC; Lev Ivan Gabriel Iwashko

(57) ABSTRACT

A toilet seat cleaning device removably connected to at least a portion of a toilet, the toilet seat cleaning device including a plurality of seat cleaning units removably connected to at least a portion of a seat of the toilet to cleanse the seat using a liquid in response to each of the plurality of seat cleaning units moving from a rear portion of the seat in a first position to at least partially toward a front portion of the seat in a second position, a liquid storing container connected to the plurality of seat cleaning units to store the liquid therein, and a sensor connected to the plurality of seat cleaning units to send a command to the plurality of seat cleaning units to move the plurality of seat cleaning units in response to a departure of a user from the seat.

5 Claims, 2 Drawing Sheets

TOILET SEAT CLEANING DEVICE

BACKGROUND

1. Field

The present general inventive concept relates generally to toilet seats, and particularly, to a toilet seat cleaning device.

2. Description of the Related Art

During everyday use, a toilet becomes increasingly dirty. A toilet seat is usually considered a ripe target for hosting pathogens (e.g., bacteria, viruses, parasites), which can lead to disease infections in humans. Sometimes, the toilet seat can be covered with urine droplets from previous users that causes a pungent odor. Not only is the toilet seat unclean, the odor can make individuals even more uneasy and anxious about using the restroom, whether in public or private settings.

Most public restrooms rely on a janitor to clean the toilets. However, in absence of the janitor, the public restroom is dependent on clean behavior of users to remain clean, which is rare.

Therefore, there is a need for a toilet seat cleaning device to automatically clean a toilet seat.

SUMMARY

The present general inventive concept provides a toilet seat cleaning device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a toilet seat cleaning device removably connected to at least a portion of a toilet, the toilet seat cleaning device including a plurality of seat cleaning units removably connected to at least a portion of a seat of the toilet to cleanse the seat using a liquid in response to each of the plurality of seat cleaning units moving from a rear portion of the seat in a first position to at least partially toward a front portion of the seat in a second position, a liquid storing container connected to the plurality of seat cleaning units to store the liquid therein, and a sensor connected to the plurality of seat cleaning units to send a command to the plurality of seat cleaning units to move the plurality of seat cleaning units in response to a departure of a user from the seat.

Each of the plurality of seat cleaning units may include a body, and a plurality of liquid dispensing nozzles disposed on at least a portion of the body to dispense the liquid toward the seat.

Each of the plurality of seat cleaning units may further include a plurality of rolling platforms disposed on at least a portion of the body to facilitate movement of the body over the seat.

The plurality of rolling platforms may be perpendicularly disposed at a first end and a second end of the body away from a center portion of the body.

Each of the plurality of seat cleaning units may further include a motor disposed within at least a portion of the body and connected to the plurality of rolling platforms to rotate the plurality of rolling platforms in response to rotation of the motor based on the command from the sensor.

Each of the plurality of seat cleaning units may further include a sponge movably disposed on at least a portion of the body to cleanse the seat in response to the body moving from the rear portion of the seat in the first position to at least partially toward the front portion of the seat in the second position, and a squeegee movably disposed on at least a portion of the body to remove the liquid from the seat in response to the body moving from the front portion of the seat in the second position to the rear portion of the seat in the first position.

The squeegee and the plurality of liquid dispensing nozzles may rotate and switch positions, such that the squeegee replaces the plurality of liquid dispensing nozzles in response to the body moving from the front portion of the seat in the second position to the rear portion of the seat in the first position.

The toilet seat cleaning device may further include a lock removably connected to a lid of the toilet to prevent the lid from closing over the seat in response to the sensor detecting an absence of the user after the toilet has been used, and allow movement of the lid after the plurality of seat cleaning units have completely cleansed the seat.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being “connected” or “coupled” to another element, it can be directly connected or coupled to the other element or intervening elements may be present. In contrast, when an element is referred to as being “directly connected” or “directly coupled” to another element, there are no intervening elements present. Other words used to describe the relationship between elements should be interpreted in a like fashion (e.g., “between” versus “directly between,” “adjacent” versus “directly adjacent,” etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Toilet Seat Cleaning Device 100
Seat Cleaning Units 110
Body 111
Liquid Dispensing Nozzles 112
Liquid Chamber 113
Rolling Platforms 114
Motor 115
Sponge 116
Squeegee 117
Liquid Storing Container 120
Connecting Tubes 130
Sensor 140
Lock 150
Light 160

Figure 1:
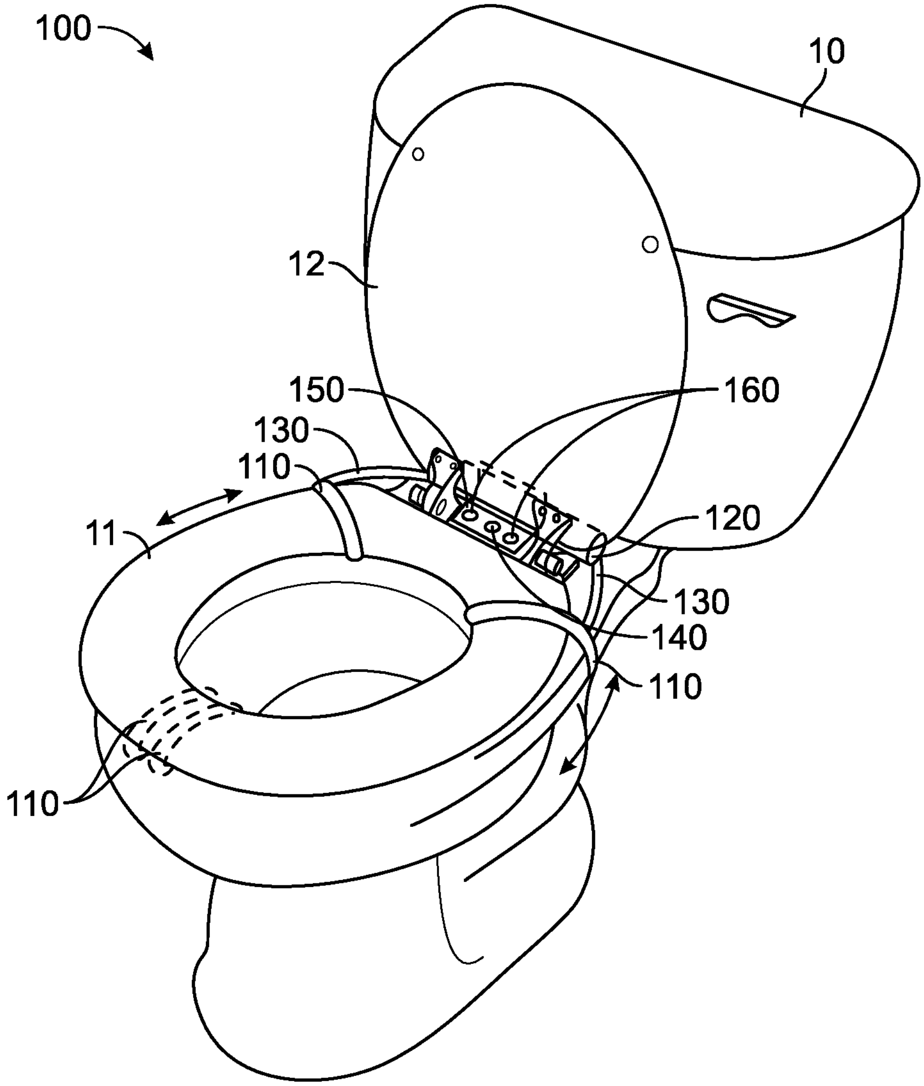
FIG. 1 illustrates an isometric view of a toilet seat cleaning device, according to an exemplary embodiment of the present general inventive concept.

FIG. 1 illustrates an isometric view of a toilet seat cleaning device 100, according to an exemplary embodiment of the present general inventive concept.

Figure 2:
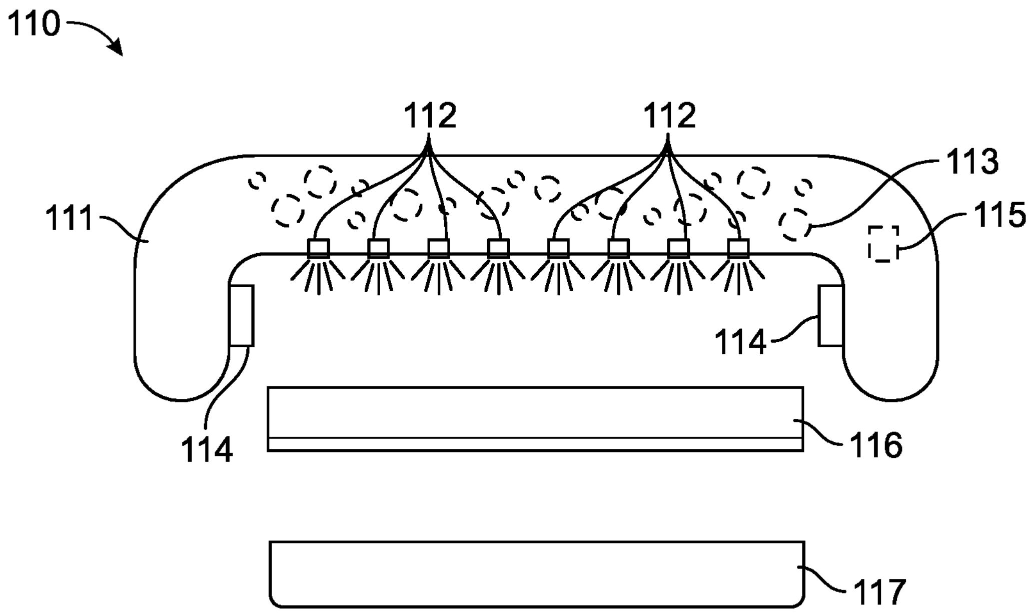
FIG. 2 illustrates a zoomed in view of a seat cleaning unit, according to an exemplary embodiment of the present general inventive concept.

FIG. 2 illustrates a zoomed in view of a seat cleaning unit 110, according to an exemplary embodiment of the present general inventive concept.

The toilet seat cleaning device 100 may be constructed from at least one of metal, plastic, wood, glass, and rubber, etc., but is not limited thereto.

The toilet seat cleaning device 100 may include a plurality of seat cleaning units 110, a liquid storing container 120, a plurality of connecting tubes 130, a sensor 140, a lock 150, and at least one light 160, but is not limited thereto.

Each of the plurality of seat cleaning units 110 may include a body 111, a plurality of liquid dispensing nozzles 112, a liquid chamber 113, a plurality of rolling platforms 114, a motor 115, a sponge 116, and a squeegee 117, but is not limited thereto.

Referring to FIGS. 1 and 2, the body 111 is illustrated to have an arcuate shape. The body 111 may be designed to curve over a surface of a seat 11 of a toilet 10. Moreover, the body 111 may be removably connected to at least a portion of the seat 11. However, the body 111 may be rectangular, circular, conical, triangular, pentagonal, hexagonal, heptagonal, octagonal, or any other shape known to one of ordinary skill in the art, but is not limited thereto.

Moreover, the body 111 may be constructed to have as a sponge. As such, the body 111 may absorb liquid therein and facilitate cleaning of the seat 11.

The plurality of liquid dispensing nozzles 112 may be disposed on at least a portion of the body 111. Each of the plurality of liquid dispensing nozzles 112 may dispense (i.e., spray) a liquid therefrom, such as water, soap, cleaning solution, and/or any combination thereof. For example, the plurality of liquid dispensing nozzles 112 may dispense the liquid toward the seat 11, such that the plurality of liquid dispensing nozzles 112 may cleanse the seat 11.

The liquid chamber 113 may be disposed within at least a portion of the body 111. The liquid chamber 113 may store the liquid therein. Additionally, the liquid chamber 113 may be connected to each of the plurality of liquid dispensing nozzles 112, such that the plurality of liquid dispensing nozzles 112 may dispense the liquid from the liquid chamber 113.

Each of the rolling platforms 114 may include a sphere, a wheel, and a tire, but is not limited thereto.

Each of the rolling platforms 114 may be disposed on at least a portion of the body 111, such as a first end and/or a second end of the body 111 perpendicularly disposed with respect to a center portion of the body 111. The plurality of rolling platforms 114 may facilitate movement of the body 111 over the seat 11 in response to rotating. In other words, the plurality of rolling platforms 114 may roll across the seat 11.

During operation, referring again to FIG. 1, the body 111 may move from a rear portion of the seat 11 in a first position to at least partially toward a front portion of the seat 11 in a second position. Conversely, the body 111 may move from the front portion of the seat 11 in the second position to the rear portion of the seat 11 in the first position. As such, the body 111 may clean and/or scrub the seat 11 to remove dirt, urine, and/or fecal matter.

The motor 115 may be disposed within at least a portion of the body 111 and/or connected to the plurality of rolling platforms 114. Each of the plurality of rolling platforms 114 may rotate in response to rotation of the motor 114.

The sponge 116 may be removably connected to at least a portion of the plurality of liquid dispensing nozzles 112. Alternatively, the sponge 116 may be movably (i.e., rotatably) disposed on at least a portion of the body 111. Also, the sponge 116 may be connected to the plurality of liquid dispensing nozzles 112, such that the sponge 116 may cleanse and/or scrub the seat 11 in response to the body 111 moving from the rear portion of the seat 11 in the first position to at least partially toward the front portion of the seat 11 in the second position.

The squeegee 117 may be removably connected to at least a portion of the plurality of liquid dispensing nozzles 112 and/or the sponge 116. Alternatively, the squeegee 117 may be movably (i.e., rotatably) disposed on at least a portion of the body 111. Also, the squeegee 117 may be connected to the plurality of liquid dispensing nozzles 112, such that the squeegee 117 may remove (i.e., dry) the liquid from the seat 11 in response to the body 111 moving from the front portion of the seat 11 in the second position to the rear portion of the seat 11 in the first position.

Furthermore, the plurality of liquid dispensing nozzles 112 and/or the sponge 116 may rotate from a first rotating position to at least partially toward a second rotating position in response to the body 111 moving from the front portion of the seat 11 in the second position to the rear portion of the seat 11 in the first position and/or rotation of the motor 115, such that the squeegee 117 may dry the seat

11. Conversely, the squeegee 117 may rotate from the second rotating position to the first rotating position to expose the plurality of liquid dispensing nozzles 112 and the sponge 116 in response to the body 111 moving from the rear portion of the seat 11 in the first position to at least partially toward the front portion of the seat 11 in the second position. As such, the plurality of liquid dispensing nozzles 112 and/or the sponge 116 may cleanse the seat 11 in response to the body 111 moving toward the front portion of the seat 11, and the squeegee 117 may be exposed, while the plurality of liquid dispensing nozzles 112 and/or the sponge 116 are rotated, to dry the seat 11.

The liquid storing container 120 may be removably connected to at least a portion of the toilet 10, such as the seat 11 and/or a lid 12. The liquid storing container 120 may store the liquid therein.

Each of the plurality of connecting tubes 130 may be connected at a first end to at least a portion of at least one of the plurality of seat cleaning units 110. Each of the plurality of connecting tubes 130 may be connected at a second end to at least a portion of the liquid storing container 120. Accordingly, the plurality of connecting tubes 130 may connect the plurality of seat cleaning units 110 to the liquid storing container 120.

The sensor 140 may include a weight sensor, a heat sensor, a motion sensor, a light sensor, and a power source (e.g., a battery, a solar cell), but is not limited thereto.

The sensor 140 may be removably connected to at least a portion of the toilet 10. The sensor 140 may detect a presence of a user on the seat 11 and/or within a predetermined proximity (e.g., five feet) of the toilet 10. The sensor 140 may activate the plurality of seat cleaning units 110 in response to detecting a departure of the user from the seat 11. In other words, the plurality of seat cleaning units 110 may cleanse the seat 11 in response to the user leaving the seat 11 and/or the predetermined proximity of the toilet 10. As such, the plurality of seat cleaning units 110 may automatically cleanse the seat 11 based on a command from the sensor 140 to the motor 115.

The lock 150 may be removably connected to at least a portion of the toilet 10. The lock 150 may activate in response to the sensor 140 detecting an absence of the user, such that the user has departed from the seat 11 and/or moved away from the predetermined proximity of the toilet 10 after using the toilet 10. As such, the lock 150 may prevent the lid 12 from moving, such that the lid 12 covers (i.e., closes) the seat 11. Subsequently, the lock 150 may release (i.e., unlock) after the plurality of seat cleaning units 110 have completely cleansed the seat 11.

The at least one light 160 may include an incandescent bulb, a light-emitting diode (LED), and a fluorescent bulb, but is not limited thereto.

The at least one light bulb 160 may be removably connected to at least a portion of the toilet 10. The at least one light bulb 160 may illuminate a surrounding area, such as the toilet 10. Moreover, the at least one light bulb 160 may facilitate use of the toilet 10 during night and/or low light conditions as detected by the sensor 140. Also, the at least one light bulb 160 may turn on in response to the user approaching the toilet 10 within the predetermined proximity and/or night and/or low light conditions. The at least one light bulb 160 may turn off in response to the absence of the user and/or day light and/or bright light conditions.

Therefore, the toilet seat cleaning device 100 may automatically clean the seat 11 after use by the user. As a result, the toilet seat cleaning device 100 may prevent growth of pathogens and/or odors around the toilet 10.

The present general inventive concept may include a toilet seat cleaning device 100 removably connected to at least a portion of a toilet 10, the toilet seat cleaning device 100 including a plurality of seat cleaning units 110 removably connected to at least a portion of a seat 11 of the toilet 10 to cleanse the seat 11 using a liquid in response to each of the plurality of seat cleaning units 110 moving from a rear portion of the seat 11 in a first position to at least partially toward a front portion of the seat 11 in a second position, a liquid storing container 120 connected to the plurality of seat cleaning units 110 to store the liquid therein, and a sensor 140 connected to the plurality of seat cleaning units 110 to send a command to the plurality of seat cleaning units 110 to move the plurality of seat cleaning units 110 in response to a departure of a user from the seat 11.

Each of the plurality of seat cleaning units 110 may include a body 111, and a plurality of liquid dispensing nozzles 112 disposed on at least a portion of the body 111 to dispense the liquid toward the seat 11.

Each of the plurality of seat cleaning units 110 may further include a plurality of rolling platforms 114 disposed on at least a portion of the body 111 to facilitate movement of the body 111 over the seat 11.

The plurality of rolling platforms 114 may be perpendicularly disposed at a first end and a second end of the body 111 away from a center portion of the body 111.

Each of the plurality of seat cleaning units 110 may further include a motor 115 disposed within at least a portion of the body 111 and connected to the plurality of rolling platforms 114 to rotate the plurality of rolling platforms 114 in response to rotation of the motor 115 based on the command from the sensor 140.

Each of the plurality of seat cleaning units 110 may further include a sponge 116 movably disposed on at least a portion of the body 111 to cleanse the seat 11 in response to the body 111 moving from the rear portion of the seat 11 in the first position to at least partially toward the front portion of the seat 11 in the second position, and a squeegee 117 movably disposed on at least a portion of the body 111 to remove the liquid from the seat 11 in response to the body 111 moving from the front portion of the seat 11 in the second position to the rear portion of the seat 11 in the first position.

The squeegee 117 and the plurality of liquid dispensing nozzles 112 may rotate and switch positions, such that the squeegee 117 replaces the plurality of liquid dispensing nozzles 112 in response to the body 111 moving from the front portion of the seat 11 in the second position to the rear portion of the seat 11 in the first position.

The toilet seat cleaning device 100 may further include a lock 150 removably connected to a lid 12 of the toilet 10 to prevent the lid 12 from closing over the seat 11 in response to the sensor 140 detecting an absence of the user after the toilet 10 has been used, and allow movement of the lid 12 after the plurality of seat cleaning units 110 have completely cleansed the seat 11.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A toilet seat cleaning device removably connected to at least a portion of a toilet, the toilet seat cleaning device comprising:

a plurality of seat cleaning units removably connected to at least a portion of a seat of the toilet to cleanse the seat using a liquid in response to each of the plurality of seat cleaning units moving from a rear portion of the seat in a first position to at least partially toward a front portion of the seat in a second position;

a liquid storing container connected to the plurality of seat cleaning units to store the liquid therein; and a sensor connected to the plurality of seat cleaning units to send a command to the plurality of seat cleaning units to move the plurality of seat cleaning units in response to a departure of a user from the seat, wherein each of the plurality of seat cleaning units comprises:

a body, a plurality of liquid dispensing nozzles disposed on at least a portion of the body to dispense the liquid toward the seat;

a sponge movably disposed on at least a portion of the body to cleanse the seat in response to the body moving from the rear portion of the seat in the first position to at least partially toward the front portion of the seat in the second position, and a squeegee movably disposed on at least a portion of the body to remove the liquid from the seat in response to the body moving from the front portion of the seat in the second position to the rear portion of the seat in the first position, wherein the squeegee and the plurality of liquid dispensing nozzles rotate and switch positions, such that the squeegee replaces the plurality of liquid dispensing nozzles in response to the body moving from the front portion of the seat in the second position to the rear portion of the seat in the first position.

2. The toilet seat cleaning device of claim 1, wherein each of the plurality of seat cleaning units further comprises:

a plurality of rolling platforms disposed on at least a portion of the body to facilitate movement of the body over the seat.

3. The toilet seat cleaning device of claim 2, wherein the plurality of rolling platforms are perpendicularly disposed at a first end and a second end of the body away from a center portion of the body.

4. The toilet seat cleaning device of claim 2, wherein each of the plurality of seat cleaning units further comprises:

a motor disposed within at least a portion of the body and connected to the plurality of rolling platforms to rotate the plurality of rolling platforms in response to rotation of the motor based on the command from the sensor.

5. A toilet seat cleaning device removably connected to at least a portion of a toilet, the toilet seat cleaning device comprising:

a plurality of seat cleaning units removably connected to at least a portion of a seat of the toilet to cleanse the seat using a liquid in response to each of the plurality of seat cleaning units moving from a rear portion of the seat in a first position to at least partially toward a front portion of the seat in a second position;

a liquid storing container connected to the plurality of seat cleaning units to store the liquid therein;

a sensor connected to the plurality of seat cleaning units to send a command to the plurality of seat cleaning units to move the plurality of seat cleaning units in response to a departure of a user from the seat; and a lock removably connected to a lid of the toilet to prevent the lid from closing over the seat in response to the sensor detecting an absence of the user after the toilet has been used, and allow movement of the lid after the plurality of seat cleaning units have completely cleansed the seat.

* * * * *